Feb. 13, 1962 F. KEILHOLZ ETAL 3,020,833
SCREW PRESS WHICH IS OPERATED BY HYDRAULIC MEANS
Filed May 6, 1958 3 Sheets-Sheet 1

INVENTORS
FRIEDRICH KEILHOLZ
LAJOS ALFÖLDI

BY *Eric D. Frankel*

PATENT AGENT

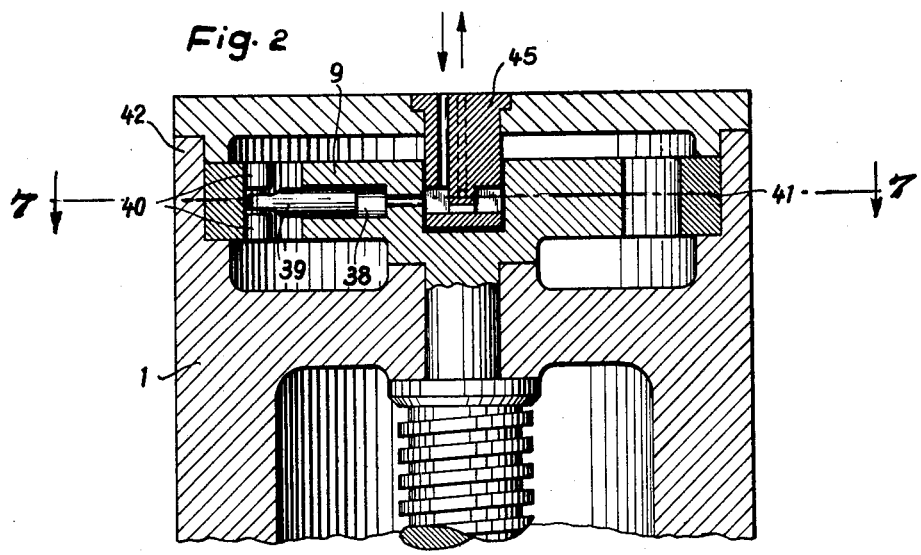
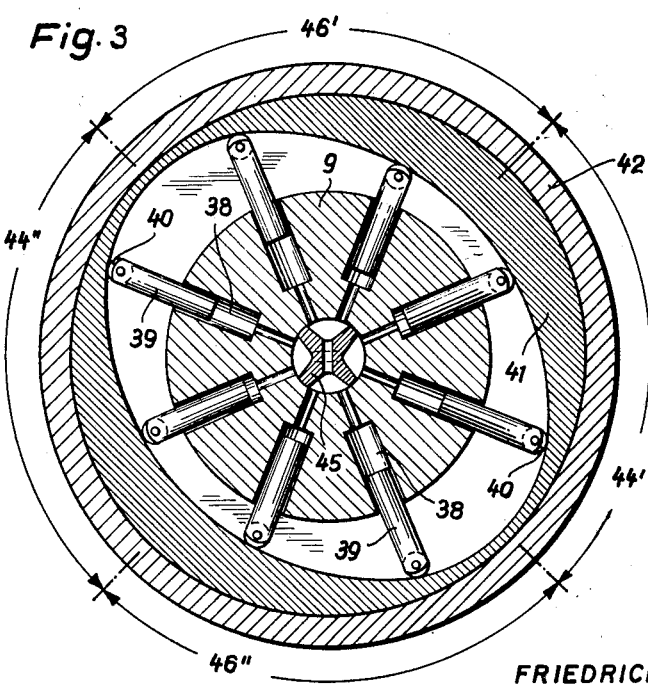

INVENTORS:
Friedrich Keilholz
Lajos Alfödi
By: George H. Spencer
Attorney

United States Patent Office 3,020,833
Patented Feb. 13, 1962

1

3,020,833
SCREW PRESS WHICH IS OPERATED BY HYDRAULIC MEANS
Friedrich Keilholz and Lajos Alfoldi, Hamm, Germany, assignors to J. Banning Aktiengesellschaft, Maschinenfabrik, Hamm, Westphalia, Germany
Filed May 6, 1958, Ser. No. 733,387
Claims priority, application Germany May 9, 1957
3 Claims. (Cl. 100—271)

The present invention relates to a screw press which is operated by hydraulic means.

Generally speaking, screw presses are provided with one or more flywheels for storing up the energy which is required for the pressing operation. In one of the known types of screw presses, the screw spindle and flywheel are driven by a disk or the like which, in turn, is driven by an electric motor and frictionally engages the flywheel along the outer edge thereof. Obviously, such a purely frictional drive of the spindle and flywheel limits the output of the screw press as it will only permit a relatively small number of strokes of the screw spindle per unit of time.

To overcome these disadvantages, drive mechanisms for screw presses have also been designed which were operated by a hydraulic medium. The driving force of such a hydraulic mechanism was acting in a direction parallel to thhe spindle axis of the screw press and therefore had to be transmitted through the screw threads of the spindle in order to rotate the flywheel. Such an arrangement necessarily entails a considerable loss of energy through friction, so that the efficiency of such a drive mechanism was comparatively low.

It is the principal object of the present invention to considerably improve the efficiency of such screw presses which are driven by a hydraulic mechanism. This object is principally attained by placing the direction of the driving force of the hydraulic mechanism within a plane extending vertically to the axis of the spindle of the screw press.

More particularly, the present invention resides in a screw press which comprises a support device; a stationary abutment on the support device; screw spindle means having a flywheel device and rotatably mounted on the support device; a press element in threaded engagement with the spindle means and being moved by the latter, upon rotation thereof, relative to the stationary abutment; and fluid pressure operated means for rotating the spindle means and oriented to exert thereon a rectilinear driving force which acts in a plane that is at right angles to the axis of the spindle means, these fluid pressure operated means including a plurality of sets of cylinders and pistons which are in star-shaped arrangement about the axis of the spindle means. The cylinders are provided in one of the mentioned devices and the pistons are slidably arranged in the cylinders, respectively. The other one of the devices is provided with camming means engaged by the exposed ends of the pistons. The fluid pressure operated means further includes means for distributing a pressure fluid to the cylinders.

Additional objects and advantages of the present invention will become apparent upon consideration of the following description when taken in conjunction with the accompanying drawings in which:

FIGURE 2 is a vertical cross section of one embodiment of the present invention.

FIGURE 3 is a cross section taken along line 3—3 of FIGURE 2.

2

Figure 4:
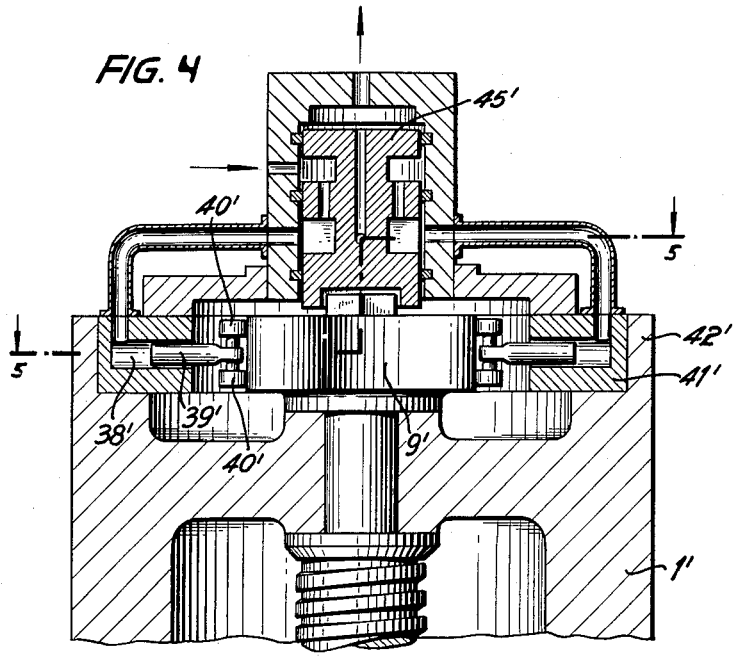
FIGURE 4 is a vertical cross section of another embodiment of the present invention.
Figure 5:
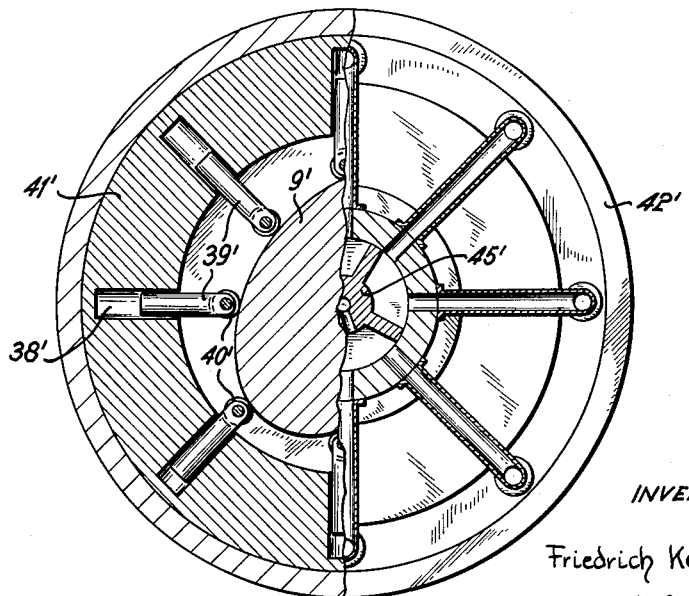

FIGURE 5 is a cross section taken along line 5—5 of FIGURE 4.

Figure 1:
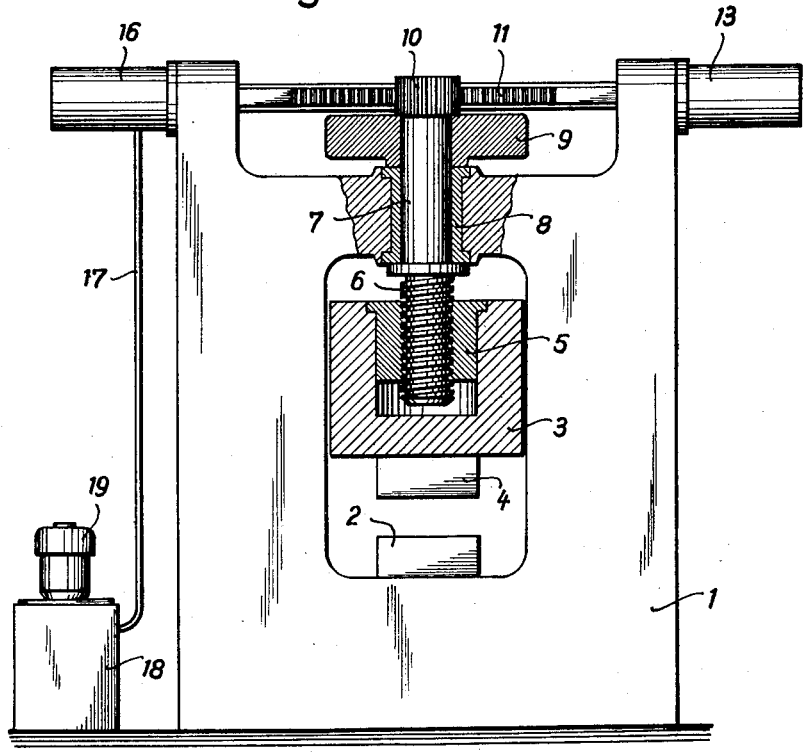
FIGURE 1 is an elevational view of a screw press of the type with which the present invention is concerned.

Referring to the drawings, FIGURE 1 shows the press frame 1 which supports the lower stationary abutment die 2. The workpiece to be molded is placed between this lower die 2 and the upper die 4 which is mounted on the ram 3. This ram 3 is provided with a nut 5 which is adapted to move upwardly and downwardly on the screw spindle 6 when the latter is rotated. The smooth part 7 of spindle 6 is rotatably mounted in a bearing 8 and carries above frame 1 the flywheel 9. On the upper end of spindle 6, a pinion 10 is secured which may also form an integral part of flywheel 9. The opposite sides of pinion 10 engage with a pair of gear racks one of which is shown at 11, the smooth ends of which form piston rods with pistons thereon, not shown, which are adapted to slide within cylinders, the two cylinders of one rack being shown at 13 and 16. A suitable pressure medium, for example, a hydraulic fluid, is supplied by a suitable apparatus 18 to cylinders 13 to 16 through conduits 17. This apparatus 18 which is driven by a motor 19, preferably an electric motor, may for example, consist of a pump, a container for holding the pressure fluid, and a control valve arrangement.

In the one embodiment of the invention as illustrated in FIGURES 2 and 3, flywheel 9 is provided with a plurality of radially extending bores 38 in a star-shaped arrangement. These bores 38 form hydraulic cylinders in which pistons 39 are slidable, the outer ends of which are provided with rollers 40. These rollers 40 are adapted to roll along an eccentrically circular or elliptical track 41 which is mounted on an upper rimlike projection 42 of frame 1. The operation of this type of drive is self-evident from the drawings. Pistons 39 which exert a driving force upon the quadrants 44' and 44" are acted upon by the stationary slide valve 45 whenever they pass upon these quadrants. They then move outwardly until they reach the ends of quadrants 44' and 44" and thereafter move inwardly along quadrants 46' and 46" so that the pressure medium will then again be forced out of cylinders 38.

As shown in FIGURES 4 and 5, in which the parts corresponding to those of FIGURES 2 and 3 are indicated by the like reference numerals but supplemented by the prime ('), the relative position of cylinders 38' and the cam shaped track 41' may also be reversed so that the cylinders or bores are disposed in a radial, star-shaped arrangement in the upwardly projecting portion 42' of frame 1', while the eccentrically circular or elliptical track 41' forms the outer peripheral surface of flywheel 9' or is secured to the latter.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A screw press comprising, in combination:
   (a) a support device;
   (b) a stationary abutment on said support device;
   (c) screw spindle means having a flywheel device and rotatably mounted on said support device;
   (d) a press element in threaded engagement with said spindle means and being moved by the latter, upon rotation thereof, relative to said stationary abutment; and
   (e) fluid pressure operated means for rotating said spindle means and oriented to exert thereon a rectilinear driving force which acts in a plane that is at right angles to the axis of said spindle means, said fluid pressure operated means including
(1) a plurality of sets of cylinders and pistons which are in star-shaped arrangement about the axis of said spindle means, said cylinders being provided in one of said devices and said pistons being slidably arranged in said cylinders, respectively, the other of said devices being provided with camming means engaged by the exposed ends of said pistons, and
(2) means for distributing a pressure fluid to said cylinders.

2. A screw press as defined in claim 1, wherein said one device is said flywheel device which has radial bores constituting said cylinders, wherein said other device which is provided with said camming means is said support device, and wherein said exposed ends of said pistons are directed radially outwardly and carry rollers which are in constant engagement with said camming means.

3. A screw press as defined in claim 1, wherein said one device is said support device which has radial bores constituting said cylinders, wherein said other device is said flywheel device whose periphery constitutes said camming means, and wherein said exposed ends of said pistons are directed radially inwardly and carry rollers which are in constant engagement with said periphery of said flywheel device.

References Cited in the file of this patent
UNITED STATES PATENTS

| | | |
|---|---|---|
| 287,107 | Dederick | Oct. 23, 1883 |
| 367,816 | Kent | Aug. 9, 1887 |
| 700,046 | Hinde | May 13, 1902 |
| 2,186,556 | Robbins | Jan. 9, 1940 |
| 2,518,578 | Tomlinson | Aug. 15, 1950 |
| 2,790,478 | Shapiro | Apr. 30, 1957 |
| 2,860,571 | Hatch | Nov. 18, 1958 |